UNITED STATES PATENT OFFICE.

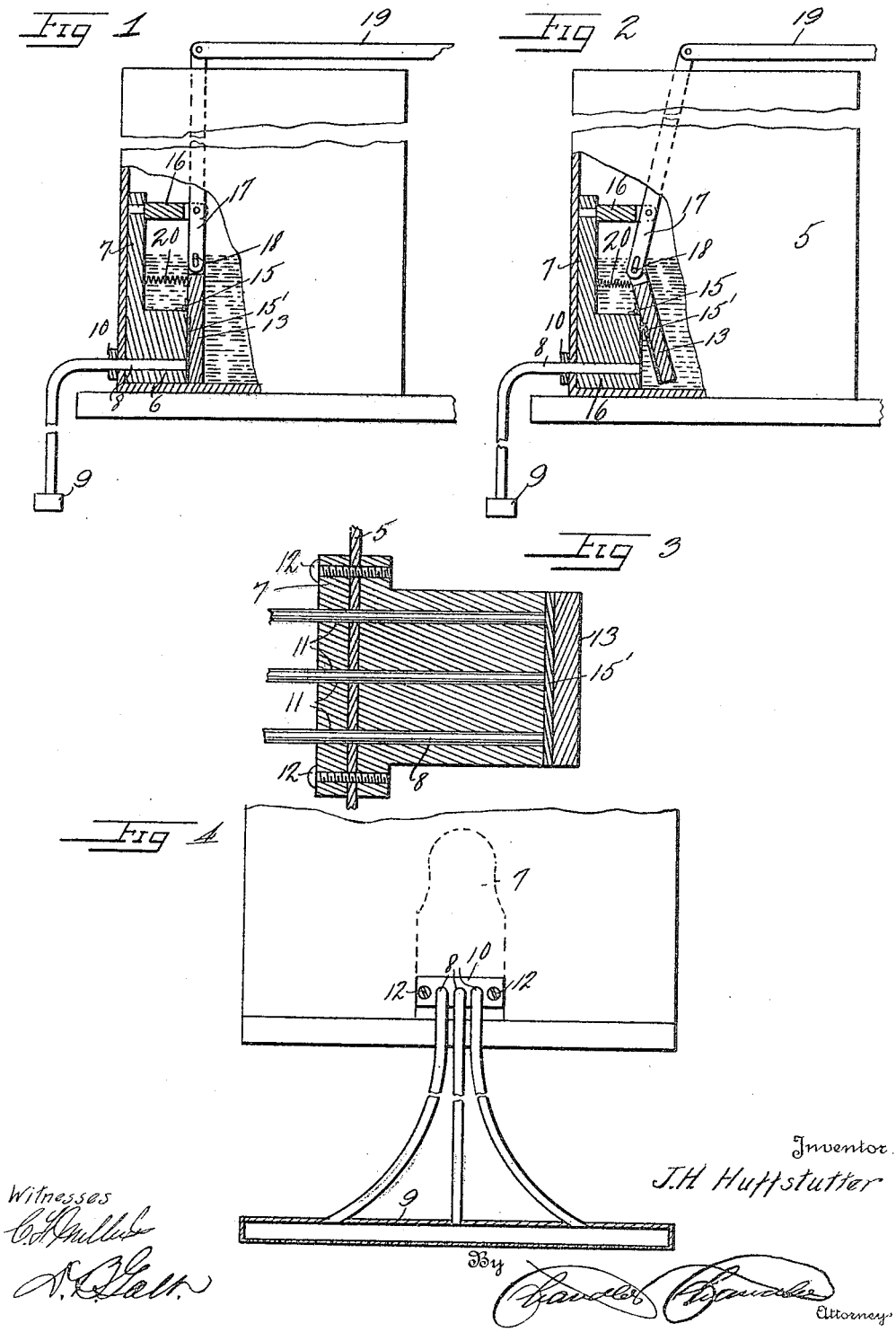

JAMES H. HUFFSTUTTER, OF CORNING, MISSOURI.

LIQUID-FERTILIZER DISTRIBUTER.

1,213,647. Specification of Letters Patent. Patented Jan. 23, 1917.

Application filed March 28, 1916. Serial No. 87,299.

*To all whom it may concern:*

Be it known that I, JAMES H. HUFFSTUTTER, a citizen of the United States, residing at Corning, in the county of Holt, State of Missouri, have invented certain new and useful Improvements in Liquid-Fertilizer Distributers; and I do hereby declare the following to be a full, clear, and exact description of the invention, such as will enable others skilled in the art to which it appertains to make and use the same.

This invention relates to liquid distributing devices, and may be more particularly identified with devices for distributing liquid fertilizer.

The primary object of the invention is to provide an improved valve construction in a distributer of the above mentioned type, which may be actuated to permit of an even distribution of liquid contained within the tank to the distributing nozzles, and which when closed, will insure the device against leakage.

A further object of the invention is to provide a device of the type described which may be readily actuated from the driver's seat, which is composed of but few inexpensive and readily assembled parts, which is arranged or constructed in such manner as to preclude breakage or derangement of the various movable parts, and which will prove thoroughly efficient in the attainment of the ends for which it is designed.

With these objects in view, together with others which will appear as the description proceeds, the invention resides in the novel combination and arrangement of parts, all as will be described more fully hereinafter, illustrated in the drawings and particularly pointed out in the claim.

The invention will be best understood by reference to the accompanying drawings, wherein:

Figure 1, is a vertical sectional view taken through a portion of a liquid fertilizer receptacle, and illustrating the application of a device embodying the invention, Fig. 2, is a view similar to Fig. 1 and illustrating the valve in open position, Fig. 3, is a horizontal sectional view taken on line 3—3 of Fig. 1, and Fig. 4, is a rear elevation showing the distributer member in section.

Referring now more particularly to the drawings 5 represents generally a tank for containing liquid fertilizer, the said tank being mounted in any suitable manner upon a traveling frame, such as a wagon body. Arranged within the tank 5, at the rear end thereof and in close proximity to the bottom is a block 6. This block is preferably formed of cast metal, and has an upwardly extending plate portion 7 adapted to lie against the interior surface of the rear wall of the tank. Extending transversely from the block 6 and in spaced parallel relation with each other are pipes or ducts 8, the said ducts projecting rearwardly from the block and through the rear wall of the tank 5. These pipes are preferably three in number, and are all disposed in the same horizontal plane, the said pipes in the rear of the tank being bent downwardly as shown, and the outermost of said pipes are bent outwardly. The pipes terminate a relatively short distance above the ground and communicate with the interior of a laterally disposed distributer member 9, the said distributer member extending preferably the entire width of the vehicle with which it is associated. This distributer may be of any preferred construction, that in the present instance comprising a metallic channel member provided in its lower wall with openings through which the fluid may escape to the ground. To securely clamp the block and plate 7 against the interior surface of the tank wall, a clamp plate 10 is provided. This plate has spaced openings 11 through which the pipes 8 extend, and screws 12 connect the plate 10 with the base of the block member 6, the said screws extending through the tank wall.

To facilitate opening or closing the communication between the interior of the tank and the pipes 7 a valve plate 13 is provided. This plate is of a width to wholly cover the forward end of the block 6, and is hinged to the upper edge of the said block as at 15. The inner face of the valve member may be covered with a suitable packing element 15′, such as sole leather or rubber, so that upon moving the valve member to closed position, the leakage of the fluid within the tank through the pipes 8 will be prevented. The valve member or plate projects upwardly beyond its hinged connection with the block, and is bifurcated as shown. Projecting forwardly from the upper end of the plate 7 is a post 16. To the free end of this post is pivotally secured a lever 17, one end of the said lever being pivoted as at 18 within the bifurcated portion of the valve member 13. The opposite end of the lever 17 projects above the upper end of the tank, and has secured thereto one end of a link 19 extending rearwardly from the driver's seat of the vehicle. A spring 20 is interposed between the upper end of the valve plate 13 and the base plate 7, the said spring tending normally to force the valve closed, and will be compressed upon opening of the valve by rocking movement of the lever 17.

From this construction it is apparent that the valve is normally maintained in closed position. Upon pull being applied to the link 19, the lever 17 will rock upon its pivot 18 and open the valve 13 against the tension of the spring 20. The liquid then will be permitted to flow from the tank 5 through the pipes 8 to the distributer member. Upon releasing the link 19 the spring 20 will automatically close the valve to discontinue the flow of liquid to the distributer. It is thus seen that a simple and efficient means is provided for controlling the flow of fertilizer to the ground over which the vehicle moves.

While I have herein shown and described a particular or preferred embodiment of the invention, I wish it to be understood that I need not confine myself to all the precise details of construction herein set forth by way of illustration, as modification and variation may be made without departing from the spirit of the invention or exceeding the scope of the claim.

What is claimed is:

In a liquid distributer, the combination with a tank, of a block secured to one wall of the tank adjacent the bottom thereof, a plate projecting upwardly from said block and lying flush with said tank wall, a post projecting upwardly from said plate, pipes extending through said block and communicating at one end with the forward face of the latter, a valve plate hingedly connected to said block and adapted to swing over the forward face of the latter, a spring for normally holding said valve plate in closed position, a lever pivoted intermediate its ends to said post, a connection between one end of said lever and said valve plate, and a link connected to the opposite end of said lever, substantially as described.

In testimony whereof, I affix my signature, in the presence of two witnesses.

JAMES H. HUFFSTUTTER.

Witnesses:
WILLIAM J. HAWKINS,
OTTO A. VOLTNUD.

Copies of this patent may be obtained for five cents each, by addressing the "Commissioner of Patents, Washington, D. C."